United States Patent
Chelin et al.

(10) Patent No.: US 12,404,820 B2
(45) Date of Patent: Sep. 2, 2025

(54) AIRCRAFT NACELLE EQUIPPED WITH AT LEAST ONE THRUST REVERSAL DEVICE COMPRISING AT LEAST ONE LONGITUDINAL DEFLECTOR CONFIGURED TO HOUSE A LONGITUDINAL ACTUATOR

(71) Applicant: Airbus Operations SAS, Toulouse (FR)

(72) Inventors: Frédéric Chelin, Toulouse (FR); Christophe Bourdeau, Toulouse (FR); Olivier Scholz, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/742,458

(22) Filed: Jun. 13, 2024

(65) Prior Publication Data
US 2024/0418137 A1    Dec. 19, 2024

(30) Foreign Application Priority Data

Jun. 16, 2023 (FR) ...................................... 2306154

(51) Int. Cl.
*F02K 1/72* (2006.01)
(52) U.S. Cl.
CPC ...................................... *F02K 1/72* (2013.01)
(58) Field of Classification Search
CPC .............. F02K 1/70; F02K 1/72; F02K 1/763
See application file for complete search history.

(56) References Cited

U.S. PATENT DOCUMENTS

| 2,798,362 | A | | 7/1957 | Rainbow et al. |
| 4,145,877 | A | * | 3/1979 | Montgomery ............ F02K 1/72 |
| | | | | 60/229 |
| 11,499,503 | B1 | | 11/2022 | Alstad et al. |
| 2016/0208739 | A1 | * | 7/2016 | Aten ......................... F02K 1/72 |
| 2020/0317355 | A1 | * | 10/2020 | Grall ........................ B64D 29/00 |
| 2024/0344486 | A1 | * | 10/2024 | Boileau ..................... F02K 1/72 |

FOREIGN PATENT DOCUMENTS

| EP | 0109219 A2 | 5/1984 |
| FR | 1092654 A | 4/1955 |
| FR | 2358555 A1 | 2/1978 |
| GB | 764907 A | 1/1957 |

OTHER PUBLICATIONS

French Search Report for corresponding French Patent Application No. 2306154 dated Dec. 14, 2023.

* cited by examiner

*Primary Examiner* — Andrew H Nguyen
(74) *Attorney, Agent, or Firm* — Greer, Burns & Crain, Ltd.

(57) ABSTRACT

An aircraft nacelle equipped with a thrust reversal device, which comprises: at least one longitudinal actuator for activating or deactivating the thrust reversal device, at least one deflection system configured to deflect an air stream channeled in the nacelle towards a lateral opening in the nacelle, in the activated state, at least one orientation system having: at least one transverse deflector configured to orient the air stream deflected by the deflection system towards the upstream end of the nacelle, for each longitudinal actuator, a hollow longitudinal deflector, which is configured to house the longitudinal actuator and has an aerodynamic profile that has a leading edge oriented towards the deflection system.

13 Claims, 5 Drawing Sheets

AIRCRAFT NACELLE EQUIPPED WITH AT LEAST ONE THRUST REVERSAL DEVICE COMPRISING AT LEAST ONE LONGITUDINAL DEFLECTOR CONFIGURED TO HOUSE A LONGITUDINAL ACTUATOR

CROSS-REFERENCES TO RELATED APPLICATIONS

This application claims the benefit of French Patent Application Number 2306154 filed on Jun. 16, 2023, the entire disclosure of which is incorporated herein by way of reference.

FIELD OF THE INVENTION

The present application relates to an aircraft nacelle equipped with at least one thrust reversal device comprising a longitudinal deflector configured to house a longitudinal actuator and to an aircraft comprising at least one aircraft propulsion unit having such a nacelle.

BACKGROUND OF THE INVENTION

According to one embodiment shown in FIGS. 1 to 3, an aircraft 10 comprises a plurality of propulsion units 12 positioned beneath each of the wings 14 of the aircraft 10 and connected to the latter by pylons 16. Each propulsion unit 12 comprises a powerplant 18 positioned inside a nacelle 20. The powerplant 18 comprises a fan that has an axis of rotation A18.

For the remainder of the description, a longitudinal direction is parallel to the axis of rotation A18. A longitudinal plane is a plane containing the axis of rotation A18 and a transverse plane is a plane perpendicular to the axis of rotation A18. The concepts of front/upstream and rear/downstream refer to the direction of flow of an air stream in the nacelle 20, this stream flowing from the front (from upstream) to the rear (downstream).

The nacelle 20 has an approximately tubular shape and delimits, with the powerplant 18, an annular duct 22 in which a secondary air stream flows. The nacelle 20 comprises an upstream part 24 and a downstream part 26, which extends to a trailing edge 28.

The nacelle 20 comprises a thrust reversal device 30 positioned in the downstream part 26 and configured to occupy an activated state, in which it deflects, outwards and upstream of the nacelle 20, at least some of the secondary air stream circulating in the annular duct 22, and an inactivated state, in which it does not deflect the secondary air stream circulating in the annular duct 22.

The thrust reversal device 30 comprises at least one lateral opening 32 (shown in FIG. 3) passing through the nacelle 20. According to one configuration, the downstream part 26 of the nacelle 20 is movable between a first position, corresponding to the inactivated state of the thrust reversal device 30, in which the downstream part 26 is in contact with the upstream part 24 (as illustrated in FIG. 2), and a second position, corresponding to the activated state of the thrust reversal device 30, in which the downstream part 26 is moved away from the upstream part 24 so as to create the lateral opening 32 (as illustrated in FIG. 3).

In order to move the downstream part 26, the thrust reversal device 30 comprises a plurality of longitudinal actuators 34, which connect the upstream and downstream parts 24, 26, are distributed over the circumference of the nacelle and are configured to move the downstream part 26 from the front to the rear, or vice versa, with respect to the upstream part 24.

The thrust reversal device 30 comprises a deflection system 36 configured to occupy a retracted position (shown in FIG. 2), when the thrust reversal device 30 is in the inactivated state, in which the deflection system 36 does not interfere with the secondary air stream, and a deployed position (shown in FIG. 3), when the thrust reversal device 30 is in the activated state, in which the deflection system 36 interferes with the secondary air stream and orients it towards the lateral opening 32.

The thrust reversal device 30 also comprises an orientation system 38 configured to orient, outwards and upstream of the nacelle, the air stream deflected by the deflection system 36. In addition, the downstream part 26 comprises a cavity 40, which is open in the direction of the upstream part 24 and is configured to house the orientation system 38 and the longitudinal actuators 34. This cavity 40 is delimited by inner and outer walls 26.1, 26.2, which are spaced apart in the direction of the upstream part 24 and connected at the trailing edge 28.

According to one embodiment shown in FIG. 4, the orientation system 38 comprises a plurality of cascades of vanes 42, which are positioned at the lateral opening 32 and each have first walls positioned in approximately longitudinal planes and second walls positioned in approximately transverse planes. The second walls take the form of a vane in order to deflect upstream the air stream leaving the lateral opening 32. Some of these cascades of vanes 42 are spaced apart in order to house the longitudinal actuators 34.

This embodiment is not satisfactory because the cascades of vanes 42 have a significant mass. Furthermore, the fact that the regions occupied by the longitudinal actuators 34 do not have an orientation system 38 impairs the effectiveness of the thrust reversal device 30.

SUMMARY OF THE INVENTION

The present invention aims to overcome all or some of the aforementioned drawbacks.

To this end, the invention relates to an aircraft nacelle, which has an upstream end and a downstream end and is configured to channel an air stream flowing in a longitudinal direction from the upstream end to the downstream end, the nacelle having at least one thrust reversal device, which comprises:

at least one lateral opening, which is remote from the upstream and downstream ends, passes through the nacelle and is delimited by upper and lower edges, at least one movable part configured to occupy a first position, corresponding to an inactivated state of the thrust reversal device, in which the movable part shuts off the lateral opening, and a second position, corresponding to an activated state of the thrust reversal device, in which the movable part at least partially clears the lateral opening, at least one longitudinal actuator, which passes through the lateral opening and is configured to move the movable part, at least one deflection system configured to occupy a first position, when the thrust reversal device is in the inactivated state, and a second position, when the thrust reversal device is in the activated state, in which the deflection system interferes with the air stream channeled in the nacelle and orients it towards the lateral opening, at least one orientation system configured to orient the air stream deflected by the deflection system.

According to the invention, the orientation system comprises:

at least one transverse deflector positioned approximately in a plane perpendicular to the longitudinal direction and configured to orient the air stream deflected by the deflection system towards the upstream end of the nacelle, each deflector having first and second ends respectively connected to a support at the upper and lower edges of the lateral opening, for each longitudinal actuator, a hollow longitudinal deflector, which is configured to house the longitudinal actuator and has an aerodynamic profile that has a leading edge oriented towards the deflection system.

This solution makes it possible to limit the impact of the longitudinal actuators on the effectiveness of the thrust reversal device.

According to another feature, each longitudinal deflector is connected to each transverse deflector.

According to another feature, each transverse deflector comprises, for each longitudinal actuator passing through it, a cutout following the profile of the longitudinal deflector in which the longitudinal actuator is housed.

According to another feature, each longitudinal deflector comprises first and second walls, each of the first and second walls having an inner edge and an outer edge that is further away from the deflection system than the inner edge is, the inner edges of the first and second walls being contiguous so as to form the leading edge, the outer edges being spaced apart.

According to another feature, the longitudinal deflector comprises a third wall connecting the outer edges of the first and second walls.

According to another feature, the first wall has a first part, which extends from the inner edge and has a first radius of curvature, and a second part, which extends from the outer edge to the first part and has a second radius of curvature. In addition, the second wall comprises a third part, which extends from the inner edge and has a third radius of curvature, and a fourth part, which extends from the outer edge to the third part and has a fourth radius of curvature.

According to other features, the third and fourth radii of curvature are equal and/or the second and fourth radii of curvature are equal and/or the first radius of curvature is significantly smaller than the third radius of curvature.

According to another feature, the orientation system comprises a plurality of transverse deflectors each having inner and outer edges.

According to another feature, the inner edges of the first and second walls of each longitudinal deflector are situated at at least one of the inner edges of the transverse deflectors.

According to another feature, the outer edges of the first and second walls of each longitudinal deflector are situated at the outer edge of at least one of the transverse deflectors.

According to another feature, the first and second walls have geometries that are determined on the basis of an orientation desired for the air stream leaving the lateral opening.

According to another feature, each longitudinal deflector extends between first and second ends, its aerodynamic profile varying between the first and second ends.

The invention also relates to an aircraft comprising at least one nacelle according to one of the preceding features.

BRIEF DESCRIPTION OF THE DRAWINGS

Other features and advantages will become apparent from the following description of the invention, the description being given solely by way of example and with reference to the appended drawings, in which.

DETAILED DESCRIPTION OF THE PREFERRED EMBODIMENTS

Figure 1:
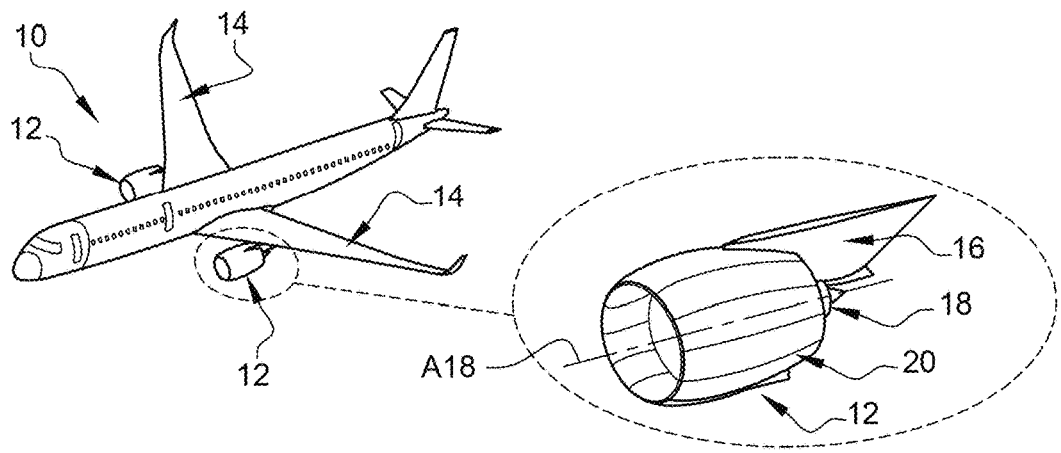
FIG. 1 is a perspective view of an aircraft and a propulsion unit.
Figure 2:
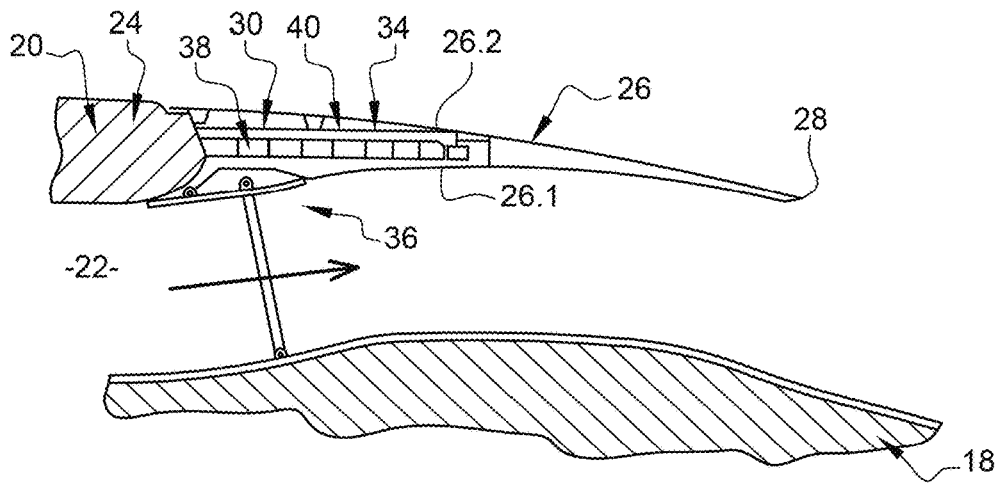
FIG. 2 is a schematic section through a propulsion unit equipped with a thrust reversal device in the inactivated state, illustrating an embodiment of the prior art.
Figure 3:
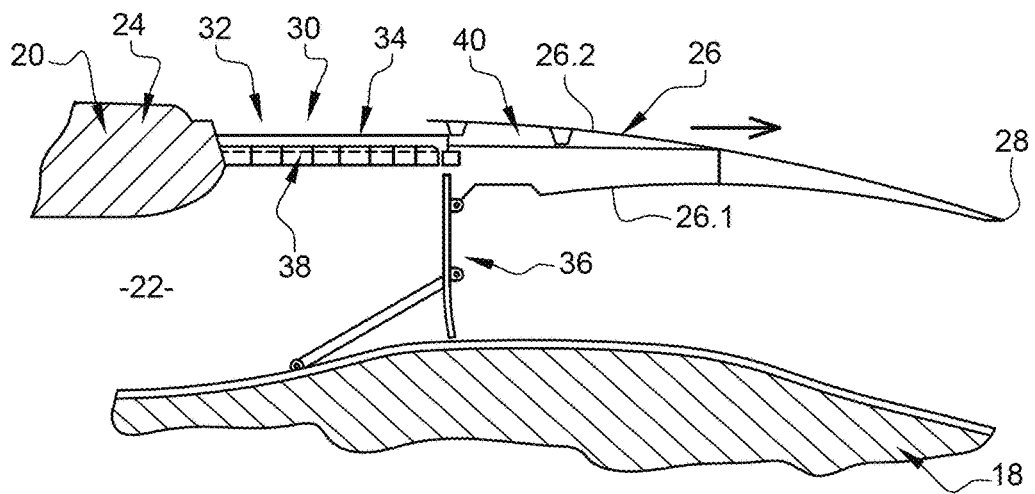
FIG. 3 is a schematic section through the propulsion unit shown in FIG. 2, the thrust reversal device being in the activated state.
Figure 4:
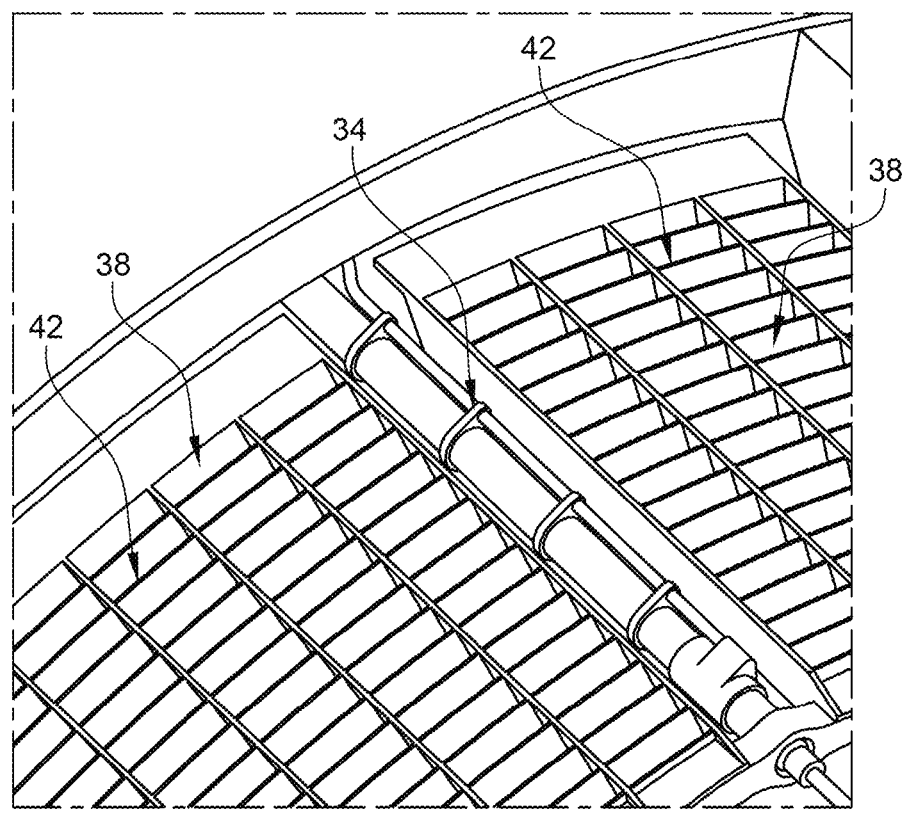
FIG. 4 is a perspective view of a part of a thrust reversal device, illustrating an embodiment of the prior art.
Figure 5:
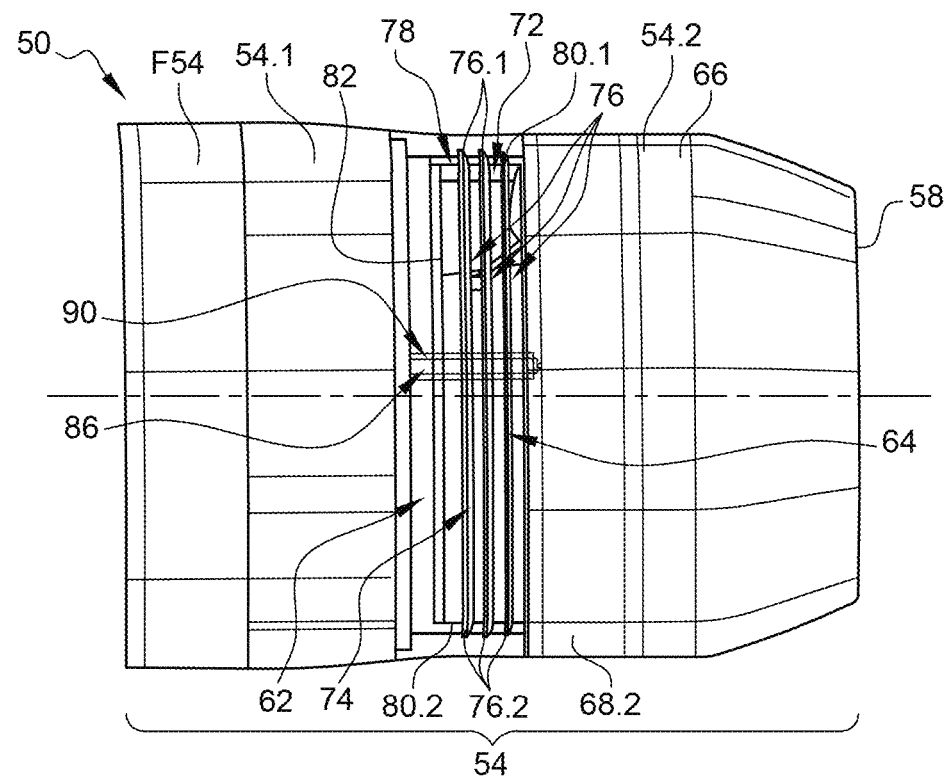
FIG. 5 is a side view of a part of a propulsion unit having a thrust reversal device in the activated state, illustrating an embodiment of the invention.
Figure 6:
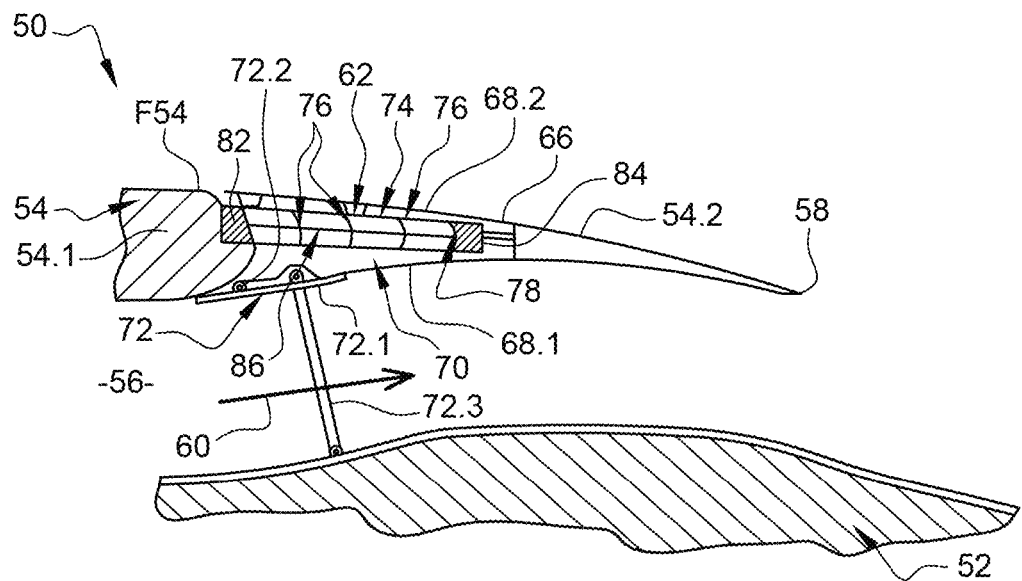
FIG. 6 is a schematic section through a propulsion unit equipped with a thrust reversal device in the inactivated state, illustrating an embodiment of the invention.
Figure 7:
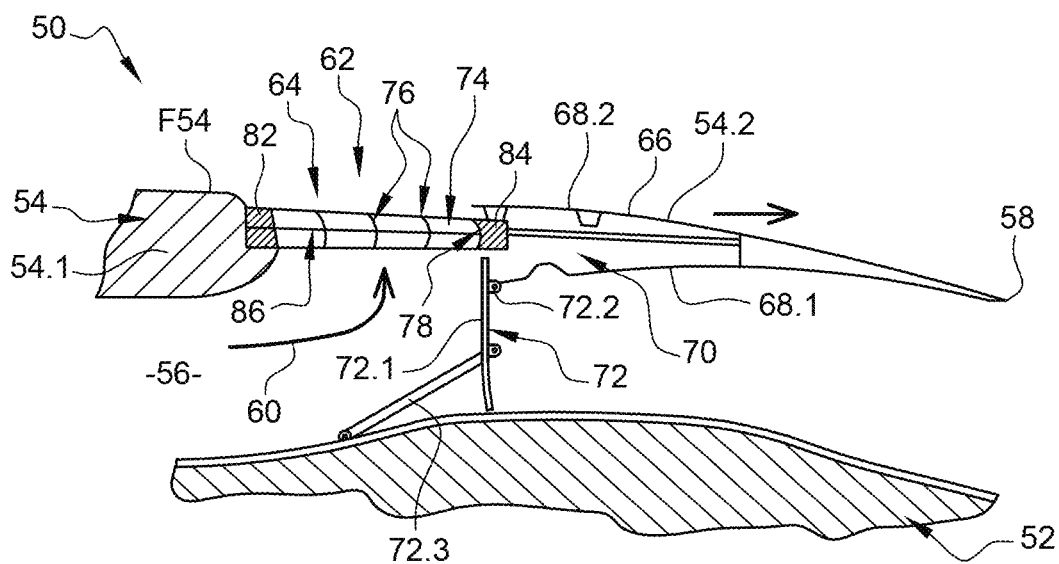
FIG. 7 is a schematic section through the propulsion unit shown in FIG. 6, the thrust reversal device being in the activated state.

According to an embodiment shown in FIGS. 5, 6 and 7, a propulsion unit 50 comprises a powerplant 52 positioned inside a nacelle 54. The latter has an approximately tubular shape and delimits, with the powerplant 52, an annular duct 56 in which a secondary air stream flows. The nacelle 54 comprises an upstream part 54.1 and a downstream part 54.2, which has a trailing edge 58. The nacelle 54 has an outer surface F54.

According to one application, an aircraft comprises at least one such propulsion unit. Irrespective of the embodiment, the nacelle 54 is tubular and extends between upstream and downstream ends. The nacelle 54 is configured to channel an air stream 60 in a longitudinal direction, from the upstream end to the downstream end.

The nacelle 54 comprises at least one thrust reversal device 62 positioned in the downstream part 54.2 and configured to occupy an activated state (shown in FIGS. 5 and 7), in which it deflects, outwards and towards the upstream end of the nacelle 54, at least some of the air stream 60 circulating in the annular duct 56, and an inactivated state (shown in FIG. 6), in which it does not deflect the air stream 60 circulating in the annular duct 56.

The thrust reversal device 62 comprises at least one lateral opening 64, which passes through the nacelle 54, is remote from the upstream and downstream ends of the nacelle 54, and is configured to place the annular duct 56 and the outside of the nacelle 54, notably its outer surface F54, in communication, and at least one movable part 66 configured to occupy a first position, corresponding to the inactivated state of the thrust reversal device 62 (shown in FIG. 6), in which the movable part 66 shuts off the lateral opening 64, and a second position, corresponding to the activated state of the thrust reversal device 62 (shown in FIGS. 5 and 7), in which the movable part 66 at least partially clears the lateral opening 64. This lateral opening 64 is delimited by upper and lower edges.

According to one embodiment, the nacelle 54 comprises two lateral openings 64, which are substantially symmetrical with respect to a vertical longitudinal plane passing through the axis of the powerplant.

According to one configuration, the downstream part 54.2 is a movable O-shaped tubular cowl, forming the movable part 66, which moves in translation in the longitudinal direction between a closed position (shown in FIG. 6), in which the downstream part 54.2 is in contact with the upstream part 54.1, when the thrust reversal device 62 is in the inactivated state, and an open position (shown in FIGS. 5 and 7), in which the downstream part 54.2 is moved away from the upstream part 54.1 so as to create the one or more lateral openings 64 between the upstream and downstream parts 54.1, 54.2 when the thrust reversal device 62 is in the activated state.

The downstream part 54.2 comprises an inner wall 68.1 and an outer wall 68.2, which are connected at the trailing edge 58, the inner and outer walls 68.1, 68.2 delimiting between them a cavity 70 that is open in the direction of the upstream part 54.1.

Of course, the invention is not limited to this configuration for the movable part 66.

The thrust reversal device 62 comprises at least one deflection system 72 configured to occupy a retracted position (shown in FIG. 6), when the thrust reversal device 62 is in the inactivated state, in which the deflection system 72 does not interfere with the air stream 60 channeled by the nacelle 54, and a deployed position (shown in FIG. 7), when the thrust reversal device 62 is in the activated state, in which the deflection system 72 is deployed in the annular duct 56, interferes with the air stream 60 and orients it in radial directions (which are perpendicular to the longitudinal direction) towards the lateral opening 64.

According to one embodiment, for each lateral opening 64, the deflection system 72 comprises at least one panel 72.1 and, for each panel 72.1, at least one articulation 72.2 connecting the panel 72.1 to the nacelle 54 and at least one link rod 72.3 connecting the panel 72.1 to the powerplant 52. Of course, the invention is not limited to this embodiment for the deflection system 72. As a result, each panel could be connected to the powerplant 52 via an articulation.

The thrust reversal device 62 also comprises at least one orientation system 74 configured to orient at least some of the air stream 60 deflected by the deflection system 72 and leaving via the lateral opening 64. According to one arrangement, the orientation system 74 is positioned at the lateral opening 64.

According to one arrangement, the orientation system 74 and the cavity 70 are configured such that, in the inactivated state, the orientation system 74 is positioned in the cavity 70.

According to one embodiment, the orientation system 74 comprises at least one transverse deflector 76, which is positioned approximately in a transverse plane and extends between first and second ends 76.1, 76.2. Each transverse deflector 76 has inner and outer edges 76.3, 76.4 that are curved, substantially in the shape of a circular arc, and connect the first and second ends 76.1, 76.2, the inner edge 76.3 being closer to the deflection system 72 than the outer edge 76.4 is. According to one configuration, the inner and outer edges 76.3, 76.4 have curvatures adapted to those of the inner and outer walls 68.1, 68.2 of the downstream part 54.2 of the nacelle 54 such that the orientation system 74 can be housed in the cavity 70 when the thrust reversal device 62 is in the inactivated state.

Each transverse deflector 76 is configured to orient, in the radial directions and towards the upstream end, the air stream deflected by the deflection system 72 and leaving the lateral opening 64.

According to one embodiment, each transverse deflector 76 comprises a blade, in the shape of a ring portion, which has a concave curvature (the center of the radius of curvature being offset upstream with respect to the transverse deflector 76) in longitudinal planes.

Figure 11:
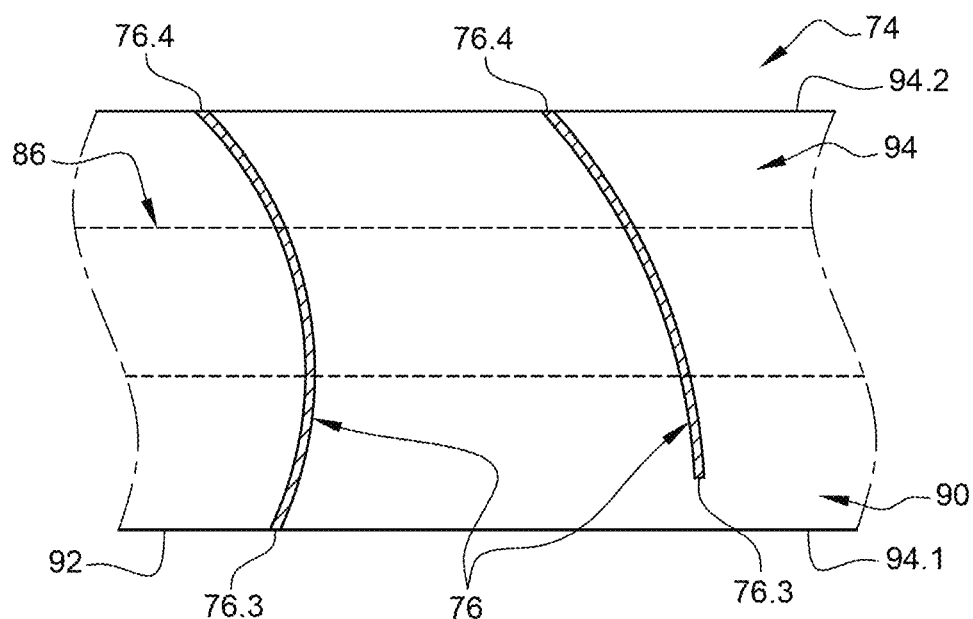
FIG. 11 is a longitudinal section through a part of an orientation system of a thrust reversal device, illustrating an embodiment of the invention.

According to one configuration, each transverse deflector 76 has a width (distance separating the inner and outer edges 76.3, 76.4) and a curvature that are constant between its first and second ends 76.1, 76.2. As a result, the air stream leaving the nacelle 54 is substantially constant around the perimeter of the nacelle 54. According to one arrangement, the transverse deflectors 76 have different widths that decrease from upstream to downstream, as illustrated in FIG. 11.

The number of transverse deflectors 76 and their shape are determined so as to obtain the same aerodynamic function as the cascades of the prior art, specifically a sufficient flow rate to avoid operational problems with the fan of the powerplant 52 and effectiveness as regards reverse thrust.

According to one embodiment, the orientation system 74 comprises at least one support 78, which is secured to the nacelle 54 and to which each transverse deflector 76 is connected.

According to an embodiment shown in FIG. 5, the support 78 comprises first and second uprights 80.1, 80.2, which are parallel to one another and to the longitudinal direction and are positioned above and below the lateral opening 64, the first end 76.1 of each transverse deflector 76 being connected to the first upright 80.1, the second end 76.2 of each transverse deflector 76 being connected to the second upright 80.2. Irrespective of the embodiment, the first and second ends 76.1, 76.2 of each transverse deflector 76 are respectively connected to the support 78 at the upper and lower edges of the lateral opening 64.

According to one configuration, the support 78 comprises an upstream crosspiece 82, which is oriented in a direction parallel to a transverse plane, is positioned upstream of the lateral opening 64, and to which the first and second uprights 80.1, 80.2 are connected. The upstream crosspiece 82 has a curvature that is substantially identical to that of the nacelle 54. The upstream crosspiece 82 is secured to the upstream part 54.1 of the nacelle 54 or integrated therein.

The support 78 comprises a downstream crosspiece 84, which is oriented in a direction parallel to a transverse plane and positioned downstream of the lateral opening 64. The downstream crosspiece 84 has a curvature that is substantially identical to that of the nacelle 54.

According to one configuration, the upstream and downstream crosspieces 82, 84 are parallel to one another and connected by the first and second uprights 80.1, 80.2. As a result, the upstream and downstream crosspieces 82, 84 and the first and second uprights 80.1, 80.2 form a frame delimiting the lateral opening 64.

The thrust reversal device 62 comprises at least one longitudinal actuator 86, which passes through the lateral opening 64 and is configured to move the movable part 66 and to occupy a retracted state, corresponding to the inactivated state of the thrust reversal device 62, in which the movable part 66 shuts off the lateral opening 64, and a deployed state, corresponding to the activated state of the thrust reversal device 62, in which the movable part 66 at least partially clears the lateral opening 64. Each longitudinal actuator 86 is oriented in a direction that is substantially parallel to the longitudinal direction.

According to one configuration, each longitudinal actuator 86 is a cylinder and connects the upstream and downstream parts 54.1, 54.2.

According to one arrangement, the thrust reversal device 62 comprises a plurality of longitudinal actuators 86, for example four longitudinal actuators 86, which are distributed over the circumference of the nacelle 54 and positioned symmetrically with respect to the vertical longitudinal plane.

Each longitudinal actuator 86 interferes with the transverse deflectors 76 of the orientation system 74. Each transverse deflector 76 comprises, for each longitudinal actuator 86 passing through it, a cutout 88 (shown in FIG. 12).

In order to limit the impact of the longitudinal actuators 86 on thrust reversal, the orientation system 74 comprises, for each longitudinal actuator 86, a hollow longitudinal deflector 90, which is configured to house the longitudinal actuator 86 and has an aerodynamic profile that has a leading edge 92 oriented towards the deflection system 72. This longitudinal deflector 90 flares away from the deflection system 72.

According to one arrangement, each longitudinal deflector 90 passes all the way through the lateral opening 64 and has a first end 90.1, which is connected to the upstream crosspiece 82, and a second end 90.2, which is connected to the downstream crosspiece 84.

According to one embodiment, each longitudinal deflector 90 comprises first and second walls 94, 96 forming a V shape in a transverse plane. Each of the first and second walls 94, 96 comprises an inner edge 94.1, 96.1 and an outer edge 94.2, 96.2 that faces the inner edge 94.1, 96.1 and is further away from the deflection system 72 than the inner edge 94.1, 96.1 is, the inner edges 94.1, 96.1 of the first and second walls 94, 96 being contiguous so as to form the leading edge 92, the outer edges 94.2, 96.2 being spaced apart so that the first and second walls 94, 96 form a housing 98 configured to house a longitudinal actuator 86.

According to one configuration, the inner edges 94.1, 96.1 of the first and second walls 94, 96 and the leading edge 92 of each longitudinal deflector 90 are situated at at least one of the inner edges 76.3 of the transverse deflectors 76. The outer edges 94.2, 96.2 of the first and second walls 94, 96 of each longitudinal deflector 90 are situated at the outer edge 76.4 of at least one of the transverse deflectors 76.

Figure 8:
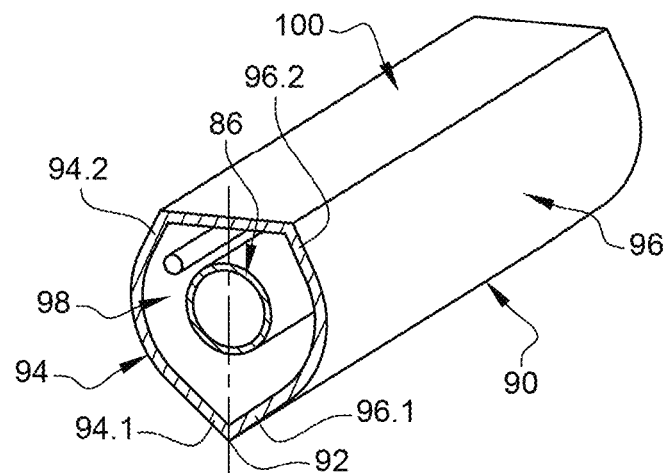
FIG. 8 is a perspective view of a part of a longitudinal deflector configured to house a longitudinal actuator, illustrating an embodiment of the invention.
Figure 9:
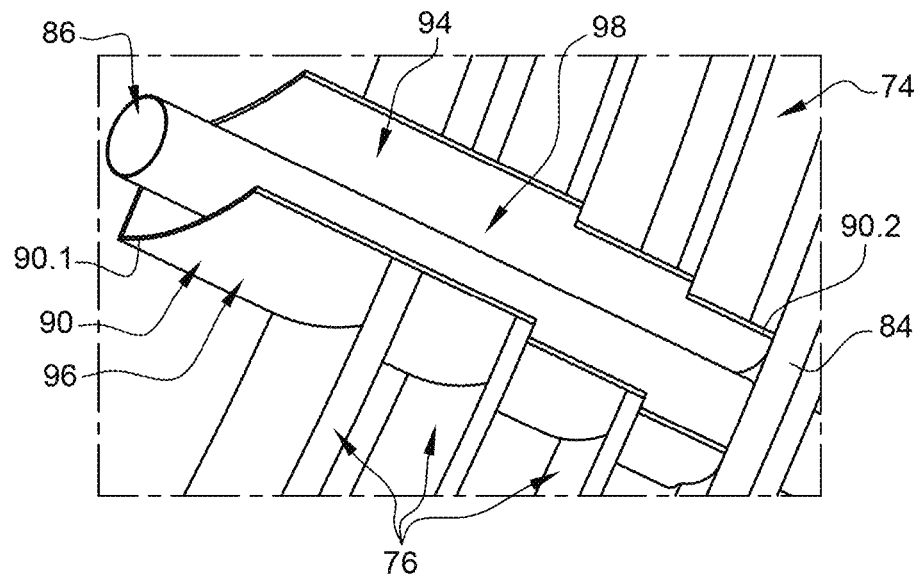
FIG. 9 is a perspective view, from the outside of the nacelle, of a part of an orientation system of a thrust reversal device, illustrating an embodiment of the invention.
Figure 10:
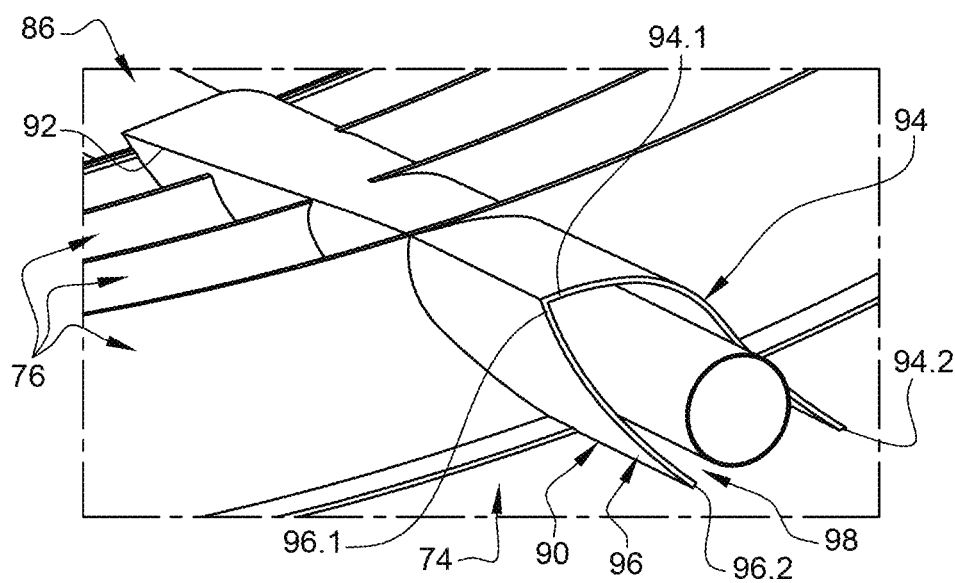
FIG. 10 is a perspective view, from the inside of the nacelle, of a part of an orientation system of a thrust reversal device, illustrating an embodiment of the invention.

According to a configuration shown in FIG. 8, the longitudinal deflector 90 comprises a third wall 100 connecting the outer edges 94.2, 96.2 of the first and second walls so as to form a tubular longitudinal deflector 90.

According to one embodiment, each longitudinal deflector 90 is connected to each transverse deflector 76. Connecting the longitudinal deflectors 90 to the transverse deflectors 76 contributes to stiffening the latter. According to one configuration, the cutout 88 in each transverse deflector 76 follows the profile of the longitudinal deflector 90.

According to one embodiment, the longitudinal deflector 90 has a constant cross section between its first and second ends 90.1, 90.2. According to another embodiment, the longitudinal deflector 90 has a non-constant cross section that varies between its first and second ends 90.1, 90.2, the cross section varying on the basis of the orientation desired for the air stream leaving the lateral opening 64.

According to one embodiment, the longitudinal deflector 90 has a cross section that is symmetrical with respect to a longitudinal plane, as illustrated in FIG. 8. According to another embodiment, the longitudinal deflector has an asymmetrical cross section. By way of example, one of the first and second walls 94, 96 has a convex profile and the other has a profile comprising a convex portion and a concave portion.

According to one embodiment, the first and second walls 94, 96 are flat. According to another embodiment, at least one of the first and second walls 94, 96 has a curved profile.

According to one configuration, the first and second walls 94, 96 may have geometries that are determined on the basis of the orientation desired for the air stream leaving the lateral opening 64. As a result, the longitudinal deflector 90 has an aerodynamic profile that varies between the first and second ends 90.1, 90.2 on the basis of the orientation desired for the air stream leaving the lateral opening 64.

Figure 12:
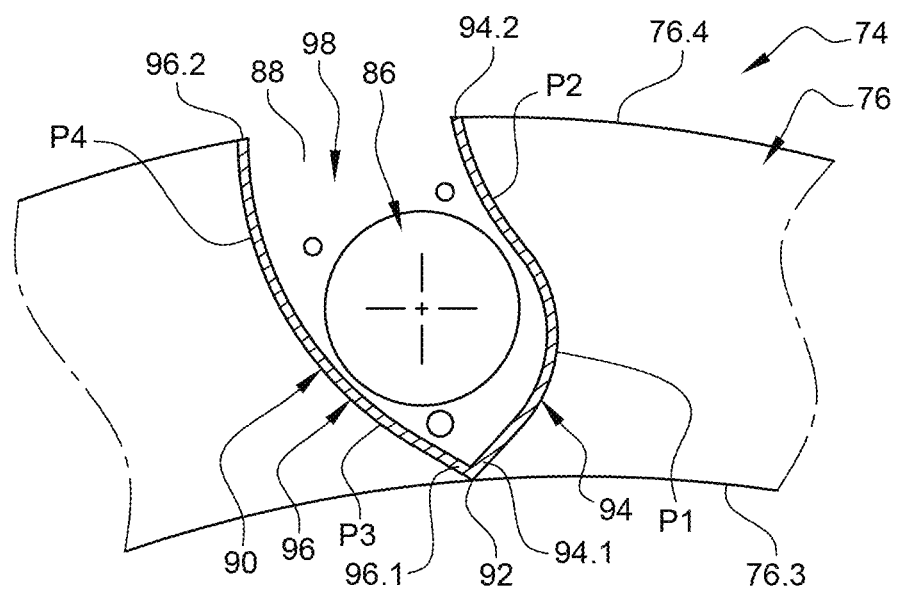
FIG. 12 is a cross section through a part of the orientation system shown in FIG. 11.

According to one embodiment shown in FIG. 12, the first wall 94 has a first part P1, which extends from the inner edge 94.1 and has a first radius of curvature, and a second part P2, which extends from the outer edge 94.2 to the first part P1 and has a second radius of curvature. The second wall 96 comprises a third part P3, which extends from the inner edge 96.1 and has a third radius of curvature, and a fourth part P4, which extends from the outer edge 96.2 to the third part P3 and has a fourth radius of curvature. According to one configuration, the third and fourth radii of curvature may be equal. The second and fourth radii of curvature may be equal. The first radius of curvature is significantly (i.e., at least 10%) smaller than the third radius of curvature.

Of course, the invention is not limited to this geometry for the longitudinal deflectors 90.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft nacelle comprising:
an upstream end and a downstream end, the aircraft nacelle configured to channel an air stream flowing in a longitudinal direction from the upstream end to the downstream end; and at least one thrust reversal device which comprises:
at least one lateral opening, which is remote from the upstream and downstream ends, which passes through the aircraft nacelle, and which is delimited by upper and lower edges,
at least one movable part configured to occupy a first position, corresponding to an inactivated state of the at least one thrust reversal device, in which the at least one movable part shuts off the at least one lateral opening, and a second position, corresponding to an activated state of the at least one thrust reversal device, in which the at least one movable part at least partially clears the at least one lateral opening,
at least one longitudinal actuator, which passes through the at least one lateral opening and is configured to move the at least one movable part,
at least one deflection system configured to occupy a first position, when the at least one thrust reversal device is in the inactivated state, and a second position, when the at least one thrust reversal device is in the activated state, in which the at least one deflection system interferes with the air stream channeled in the aircraft nacelle and orients the air stream towards the at least one lateral opening,
at least one orientation system configured to orient the air stream deflected by the at least one deflection system, wherein the at least one orientation system comprises:
at least one transverse deflector positioned approximately in a plane perpendicular to the longitudinal direction and configured to orient the air stream deflected by the at least one deflection system towards the upstream end of the aircraft nacelle, each transverse deflector having first and second ends respectively connected to a support at the upper and lower edges of the at least one lateral opening, and, for each longitudinal actuator, a hollow longitudinal deflector, which is configured to house the longitudinal actuator and has an aerodynamic profile that has a leading edge oriented towards the at least one deflection system;
wherein each longitudinal deflector is connected to each transverse deflector and comprises first and second walls; and
wherein at least one of the first and second walls of the longitudinal deflector has a curved profile; and
wherein each of the first and second walls has an inner edge and an outer edge that is further away from the at least one deflection system than the inner edge is, the inner edges of the first and second walls being contiguous so as to form the leading edge, the outer edges being spaced apart, wherein the first and second walls of each longitudinal deflector form a V shape at the leading edge in a transverse plane.

2. The aircraft nacelle according to claim 1, wherein each transverse deflector comprises, for each longitudinal actuator passing therethrough, a cutout following the profile of the longitudinal deflector in which the longitudinal actuator is housed.

3. The aircraft nacelle according to claim 1, wherein each longitudinal deflector comprises a third wall connecting the outer edges of the first and second walls.

4. The aircraft nacelle according to claim 1, wherein the first wall has a first part, which extends from the inner edge and has a first radius of curvature, and a second part, which extends from the outer edge to the first part and has a second radius of curvature, and
wherein the second wall comprises a third part, which extends from the inner edge and has a third radius of curvature, and a fourth part, which extends from the outer edge to the third part and has a fourth radius of curvature.

5. The aircraft nacelle according to claim 4, wherein the third and fourth radii of curvature are equal, or the second and fourth radii of curvature are equal, or the first radius of curvature is significantly smaller than the third radius of curvature, or a combination thereof.

6. The aircraft nacelle according to claim 1, wherein the at least one orientation system having at least one transverse deflector comprises a plurality of transverse deflectors each having inner and outer edges and in that the inner edges of the first and second walls of each longitudinal deflector are situated least one of the inner edges of the transverse deflectors from the plurality of transverse deflectors.

7. The aircraft nacelle according to claim 1, wherein the at least one orientation system having at least one transverse deflector comprises a plurality of transverse deflectors each having inner and outer edges and in that the outer edges of the first and second walls of each longitudinal deflector are situated at the outer edge of at least one of the transverse deflectors from the plurality of transverse deflectors.

8. The aircraft nacelle according to claim 1, wherein the first and second walls have geometries that are determined on a basis of an orientation desired for the air stream leaving the at least one lateral opening.

9. The aircraft nacelle according to claim 1, wherein each hollow longitudinal deflector extends between first and second ends and has an aerodynamic profile varying between the first and second ends of the hollow longitudinal deflector.

10. An aircraft comprising:
the nacelle according to claim 1.

11. The aircraft nacelle according to claim 1, wherein each longitudinal deflector has a cross section that is symmetrical with respect to a longitudinal plane.

12. The aircraft nacelle according to claim 1, wherein each longitudinal deflector has a cross section that is asymmetrical with respect to a longitudinal plane.

13. The aircraft nacelle according to claim 1, wherein one of the first and second walls has a convex profile and the other has a profile comprising a convex portion and a concave portion.

* * * * *